US011951742B2

(12) United States Patent
Yonemoto et al.

(10) Patent No.: US 11,951,742 B2
(45) Date of Patent: Apr. 9, 2024

(54) SUBSTRATE JOINED BODY

(71) Applicant: CANON KABUSHIKI KAISHA, Tokyo (JP)

(72) Inventors: Taichi Yonemoto, Kanagawa (JP); Yoshiyuki Fukumoto, Kanagawa (JP); Atsunori Terasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 17/751,925

(22) Filed: May 24, 2022

(65) Prior Publication Data

US 2022/0379606 A1 Dec. 1, 2022

(30) Foreign Application Priority Data

May 31, 2021 (JP) ................................ 2021-091395

(51) Int. Cl.
*B41J 2/14* (2006.01)
*B41J 2/16* (2006.01)

(52) U.S. Cl.
CPC ............ *B41J 2/1433* (2013.01); *B41J 2/162* (2013.01); *B41J 2/1623* (2013.01); *B41J 2/1642* (2013.01); *B41J 2002/14362* (2013.01)

(58) Field of Classification Search
CPC ........ B41J 2/1433; B41J 2/162; B41J 2/1623; B41J 2/1642; B41J 2002/14362; B41J 2/1606; B41J 2/1628; B41J 2/1632; B41J 2/1645; B41J 2/1646; B41J 2/161
See application file for complete search history.

(56) References Cited

FOREIGN PATENT DOCUMENTS

| | | | |
|---|---|---|---|
| JP | 2014-124887 A | | 7/2014 |
| JP | 2019209573 A | * | 12/2019 |

OTHER PUBLICATIONS

Machine Translation of Manufacturing Method of Liquid Discharge Head (JP 2019-209573) to Fukumoto Takayuki et al., Dec. 12, 2019, [Description of Embodiments, Embodiment 1] (Year: 2019).*
Shimoda et al., U.S. Appl. No. 17/751,916, filed May 24, 2022.

* cited by examiner

*Primary Examiner* — Lisa Solomon
(74) *Attorney, Agent, or Firm* — Venable LLP

(57) ABSTRACT

A substrate joined body including: a first substrate; a second substrate; an organic film that comprises silicon and carbon and joins the first substrate and the second substrate; and a protective film that comprises an inorganic element and is formed over the organic film from at least a part of the surface of the first substrate and at least a part of the surface of the second substrate, wherein the protective film comprises a region in which the ratio of carbon to silicon based on atomic percentage is from 0.0 to 5.0 in a region within 50 nm in a thickness direction from a surface of the organic film on the protective film side, when the surface is measured by X-ray photoelectron spectroscopy.

13 Claims, 6 Drawing Sheets

SUBSTRATE JOINED BODY

BACKGROUND OF THE INVENTION

Field of the Invention

The present disclosure relates to a substrate joined body.

Description of the Related Art

A liquid discharge head (also referred to as an inkjet recording head or a liquid ejection head) that discharges a liquid is an example of a functional device such as a MEMS (Micro Electro Mechanical System) such as a pressure sensor or an acceleration sensor, a micro fluid device, and the like. In the manufacture of these devices, a device configured of a substrate joined body in which substrates are joined to each other with an organic film (adhesive) interposed therebetween is manufactured.

In the liquid discharge head, the inner wall surface of an ink flow path is easily eroded by the ink, and when exposed to the ink for a long period of time, the flow path structure may collapse. In particular, when the substrate is a silicon substrate, such damage caused by ink is likely to occur. Further, when the ink flow path is formed by joining substrates in which flow path shapes have been machined with an organic film (adhesive) interposed therebetween, ink penetrates into the interfaces between the substrates and the organic film, and the adhesive strength may decrease.

As a method for reducing such damage caused by ink to the substrate and the organic film (adhesive), a method for protecting the surface of the substrate joined body with a protective film (liquid resistant film) that is not easily eroded by ink has been proposed (Japanese Patent Application Laid-open No. 2014-124887). FIG. 1 illustrates a surface protection method for a substrate joined body (liquid ejection head) described in Japanese Patent Application Laid-open No. 2014-124887. The liquid ejection head shown in FIG. 1 is provided with a flow path including a nozzle opening 21 for discharging liquid, and includes substrates 10, 15 and 20 laminated with adhesives 210 to 212 interposed therebetween. On the inner wall surface of the flow path, at least one material (protective film 200) selected from the group consisting of tantalum oxide, hafnium oxide and zirconium oxide formed by atomic layer deposition from the inner wall surface over the top of the adhesives 210 to 212 is continuously provided. Japanese Patent Application Laid-open No. 2014-124887 indicates that such a configuration suppresses the erosion of the silicon substrates by the liquid, and can suppress liquid leakage, poor droplet discharge, and peeling of the laminated substrates.

SUMMARY OF THE INVENTION

However, the present inventors have found that even when the protective film is formed from the inner wall surface of the ink flow path over the top of the organic film (adhesive) as in Japanese Patent Application Laid-open No. 2014-124887, the high quality protective film can be difficult to form on the organic film (adhesive).

This is presumably because the organic film (adhesive) is slightly deformed due to temperature changes, pressure changes, and the like applied to the substrate joined body in the manufacturing process, stress is applied to the protective film, and cracks (hair cracks) occur in the protective film due to the adhesive force between the protective film and the organic film and the rigidity of the protective film.

In particular, where a protective film including an inorganic element such as shown in Japanese Patent Application Laid-open No. 2014-124887 is directly formed on an organic film (adhesive), when the adhesive force between the protective film and the organic film (adhesive) is weak and/or when the protective film is not rigid enough even if the adhesive force is ensured, the protective film may be peeled off by the force acting on the interface between the protective film and the organic film (adhesive). It is considered that where the protective film is peeled off, ink infiltrates from the peeled segment and damages the organic film (adhesive), which results in poor bonding between the substrates. In addition, it is considered that the protective film may peel off and become dust that floats in the flow path, which may affect the discharge performance.

Further, such a problem may occur when a protective film is formed on an organic film attached to or formed on at least a part of the substrate not only in the abovementioned substrate joined body. That is, when a protective film (for example, a film that protects some functional element, wiring, or the like) is formed on an organic film and the protective film is formed satisfactorily, peeling and hair cracking of the protective film becomes a problem.

This disclosure was made in view of the above issues. That is, the present disclosure provides a substrate joined body in which cracking and peeling of a protective film can be suppressed.

The present invention discloses a substrate joined body comprising:

a first substrate;

a second substrate;

an organic film that comprises silicon and carbon, and the organic film joins the first substrate and the second substrate; and a protective film that comprises an inorganic element, and the protective film is formed over the organic film from at least a part of a surface of the first substrate and at least a part of a surface of the second substrate, wherein the organic film comprises a region in which a ratio of carbon to silicon based on atomic percentage is from 0.0 to 5.0 in a region within 50 nm in a thickness direction from a surface of the organic film on the protective film side, when the surface is measured by X-ray photoelectron spectroscopy.

According to the present disclosure, a substrate joined body in which cracking and peeling of a protective film can be suppressed is provided.

Further features of the present invention will become apparent from the following description of exemplary embodiments with reference to the attached drawings.

DESCRIPTION OF THE EMBODIMENTS

Hereinafter, preferred embodiments of the present disclosure will be described with reference to the drawings. In the following description, the substrate joined body and the manufacturing method thereof according to the present disclosure will be described by taking a liquid discharge head as an example, but the present disclosure is not limited to the application to the liquid discharge head.

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined. In the following description, the same number is assigned in the figures to structures that have the same function, and in some instances a description thereof may be omitted.

Figure 2A:
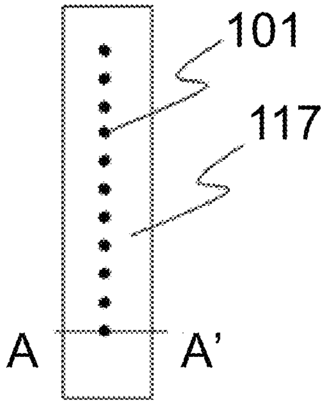
FIG. 2A is a plan view of the substrate joined body of the present disclosure.
Figure 2B:
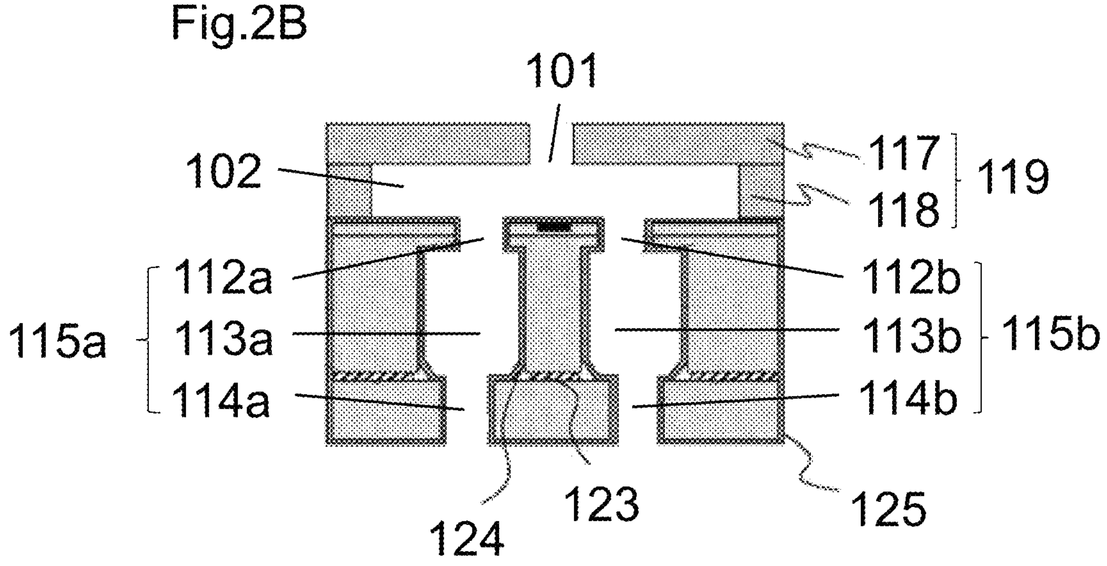
FIG. 2B is a cross-sectional view taken along the line A-A' in the plan view.

FIG. 2A is a plan view of the substrate joined body of the present disclosure, and FIG. 2B is a cross-sectional view taken along the line A-A' in the plan view.

The present invention discloses a substrate joined body comprising:

a first substrate;

a second substrate;

an organic film that comprises silicon and carbon, and the organic film joins the first substrate and the second substrate; and a protective film that comprises an inorganic element, and the protective film is formed over the organic film from at least a part of a surface of the first substrate and at least a part of a surface of the second substrate, wherein the organic film comprises a region in which a ratio of carbon to silicon based on atomic percentage is from 0.0 to 5.0 in a region within 50 nm in a thickness direction from a surface of the organic film on the protective film side, when the surface is measured by X-ray photoelectron spectroscopy.

Figure 1:
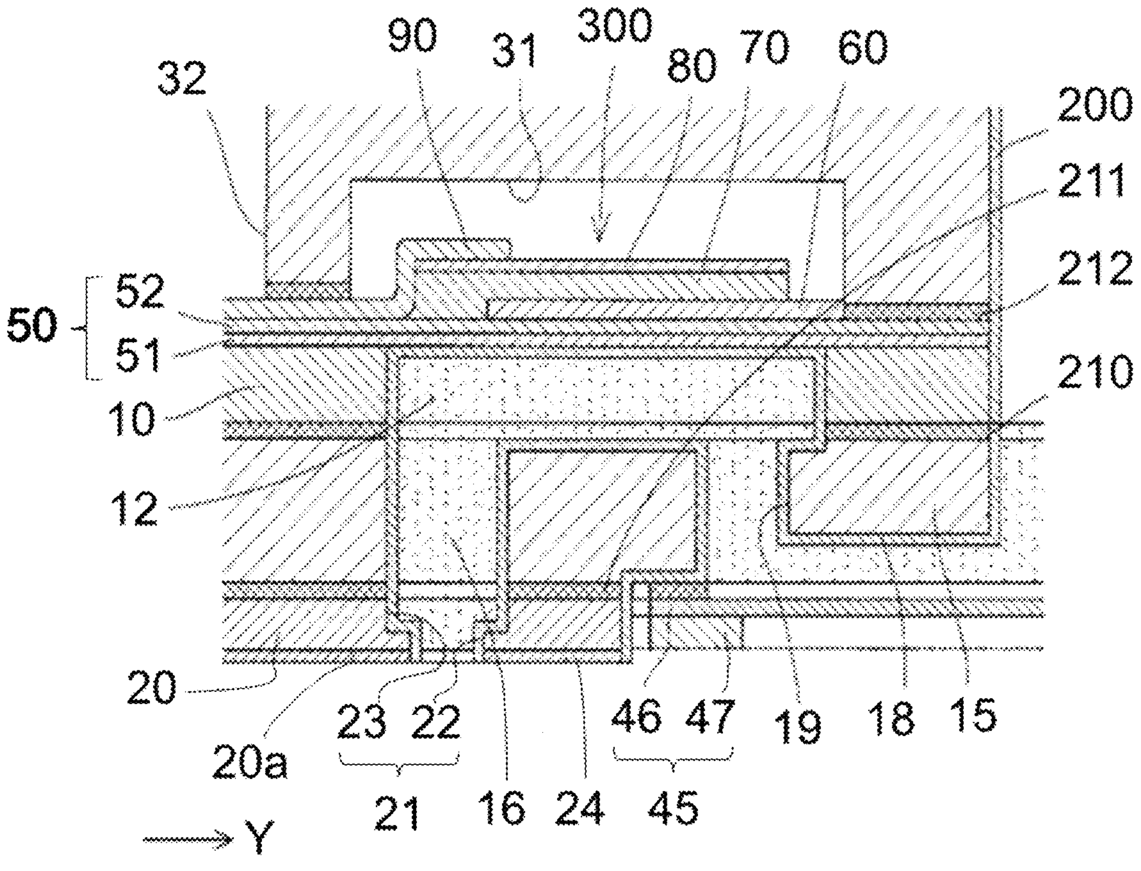
FIG. 1 is a cross-sectional view showing a conventional substrate joined body.

The symbols in FIG. 1 are as follows. 10: flow channel forming substrate, 12: pressure generating chamber, 15: connecting board (substrate), 16: nozzle connecting passage, 18: second manifold section, 19: ink supply channel, 20: nozzle plate (substrate), 20*a*: liquid ejection surface, 21: nozzle opening, 22: first cylindrical section, 23: second cylindrical section, 24: liquid repellent membrane, 31: holding part, 32: through hole, 45: compliance substrate, 46: sealing film, 47: fixed substrate, 50: vibrating plate, 51: elastic membrane, 52: insulator film, 60: first electrode, 70: piezoelectric layer, 80: second electrode, 90: lead electrode, 200: protective film, 210 to 212: adhesives, 300: piezoelectric actuators, Y: Row direction for multiple rows of pressure generating chambers 12.

The symbols in FIGS. 2A to 2B, 3A to 3H, and 4A to 4C are as follows. 101: discharge port, 107: energy generating element, 115: flow path, 117: top plate, 118: wall, 119: discharge port forming member, 123: organic film (adhesive), 124: region in which carbon/silicon ratio is from 0.0 to 5.0, 125: protective film, 130: substrate joined body, 131: first substrate, 132: second substrate, 134: region in which the first substrate and second substrate are joined.

The present invention discloses a liquid discharge head comprising:

a substrate joined body comprising a first substrate, a second substrate, an organic film 123 that comprises silicon and carbon, and the organic film joins the first substrate and the second substrate, and a protective film 125 that comprises an inorganic element, and the protective film is formed over the organic film 123 from at least a part of a surface of the first substrate and at least a part of a surface of the second substrate; and a discharge port forming member 119 comprises a top plate 117 on which a wall 118 and a discharge port 101 is formed, wherein the first substrate further comprises an energy generating element 107, and the organic film 123 comprises a region 124 in which a ratio of carbon to silicon based on atomic percentage is from 0.0 to 5.0 in a region within 50 nm in a thickness direction from a surface of the organic film 123 on the protective film 125 side, when the surface is measured by X-ray photoelectron spectroscopy.

A method for forming the protective film 125 will be described hereinbelow. The protective film 125 of the present embodiment is formed using a technique for forming a film by repeating surface saturation adsorption of at least one agent selected from the group consisting of an oxidizing agent and a nitriding agent and a raw material gas by an atomic layer deposition method (ALD method).

The protective film preferably comprises at least one element selected from the group consisting of Ta, Ti, Zr, Nb, V, Hf, and Si as a simple substance, an oxide, a nitride, or a carbide. Among these, the protective film preferably comprises an oxide of at least one element selected from the group consisting of Ta, Ti, Zr, Nb, V, Hf, and Si, and more preferably comprises at least one compound selected from the group consisting of TaO, TiO, SiOC, SiC, SiCN, TaN, and TiN.

The thickness of the protective film is not particularly limited, but is preferably from 10 to 300 nm, and more preferably from 50 to 200 nm. The amount of the inorganic element in the protective film is preferably from 25 to 75% by mass, and more preferably from 30 to 70% by mass. Further, the amount of the abovementioned compound in the protective film is preferably from 50 to 100% by mass, and more preferably from 80 to 100% by mass.

Among them, an ALD-TiO film formed by using titanium tetrachloride ($TiCl_4$) as the raw material gas and pure water as the oxidizing agent will be specifically described as an example.

A film is formed by alternately supplying $TiCl_4$ and pure water and repeating surface saturation adsorption of the oxidizing agent and the raw material gas, and the precursor molecules and water molecules that are the raw materials are delivered into the substrate in a vacuum chamber to cause the adsorption of molecules targeted at about one molecular layer on the substrate surface. At this time, the functional group in the precursor is adsorbed on the hydroxyl group present on the substrate surface, and the functional group detaches a hydrogen atom from the hydroxyl group and is desorbed as a volatile molecule. After that, the remaining oxygen atom and the inorganic element (here, Ti element) in the precursor are bonded by a covalent bond. In the exhaust step, the molecules that were not completely adsorbed on the substrate surface in the deposition step and stayed in the chamber are exhausted.

In the atomic layer deposition method, since a strong bond is formed by covalent bonds, it is possible to form a protective film with a high adhesive force. In addition, since the atomic layer deposition method is a film formation method that uses saturated chemical adsorption rather than plasma excitation or ion acceleration energy, a single-phase adsorption layer can be formed equally on all surfaces exposed to the raw material gas, and since the film thickness is the same in all places where the raw material gas can flow in, the protective film has good throwing power with respect to grooves and holes having a high aspect ratio.

Since a protective film is formed by the reaction between the hydroxyl groups chemically adsorbed on the surface of the organic film and the raw material gas, the properties and adhesive force of the protective film are greatly affected by how many hydroxyl groups the organic film has. The state of the organic film surface suitable for the atomic layer deposition method is an active state showing hydrophilicity like an oxide crystal, and where the surface is hydrophilic, it has a strong affinity with water molecules, and a monomolecular layer of water is easily formed by chemical adsorption. Further, where the organic film surface is in a hydrophobic state such as that of carbon and carbides, the affinity with water molecules is low and a monomolecular layer of water is unlikely to be formed. When the organic film includes silicon, many hydroxyl groups can be introduced into the organic film, so that the organic film surface can be controlled to be in an active state exhibiting hydrophilicity as described above.

For this reason, in order to form a dense film that adheres well to the organic film surface, it is important to have an oxidized surface with a small amount of carbon. Therefore, it is conceivable to oxidize the organic film. It is known that carbon can be easily sublimated by using an oxidation treatment such as oxygen ashing. In order to form a protective film on the organic film, it is important that the organic film have a structure that can form an oxide layer after reducing the carbon on the surface of the organic film by using a carbon reduction step such as oxidation treatment. For this reason, it is important that the organic film of the present disclosure includes at least one selected from the group consisting of an organosilicon compound to which a hydroxyl group can be adsorbed and a polymer of the organosilicon compound. Where the organic film of the present disclosure includes at least one selected from the group consisting of an organosilicon compound and a polymer of the organosilicon compound, more hydroxyl groups can be introduced into the organic film, so that the organic film surface can be more easily controlled to the active state showing hydrophilicity such as described above.

In the present embodiment, a sample obtained by using a compound having a structure in which benzocyclobutene has a siloxane bond and/or a polysiloxane bond, specifically, divinyltetramethylsiloxane benzocyclobutene, as the organosilicon compound, and subjecting the organic film surface to oxygen ashing by plasma oxidation using $O_2$ plasma (carbon reduction step), and a sample that has not been subjected to the oxygen ashing were prepared, and a protective film was grown on each sample for verification. The protective film was an ALD-TiO film formed by using titanium tetrachloride ($TiCl_4$) as the raw material gas and pure water as the oxidizing agent.

In oxygen ashing, oxygen ions and oxygen radicals were generated by high frequency in an oxygen gas flow. Oxygen ions and oxygen radicals only thinly oxidize the surface of the silicon film, but volatilize the carbon, which is the main component of the organic film, to reduce the amount of carbon in the organic film.

In the present embodiment, ashing was performed for 1 min without applying RF bias power at a stage temperature of 250° C. Then, a protective film was formed with an ALD-TiO film formed from titanium tetrachloride ($TiCl_4$) and pure water. The film formation temperature at this time was 300° C., and the film thickness of the protective film was 130 nm.

Figure 5:
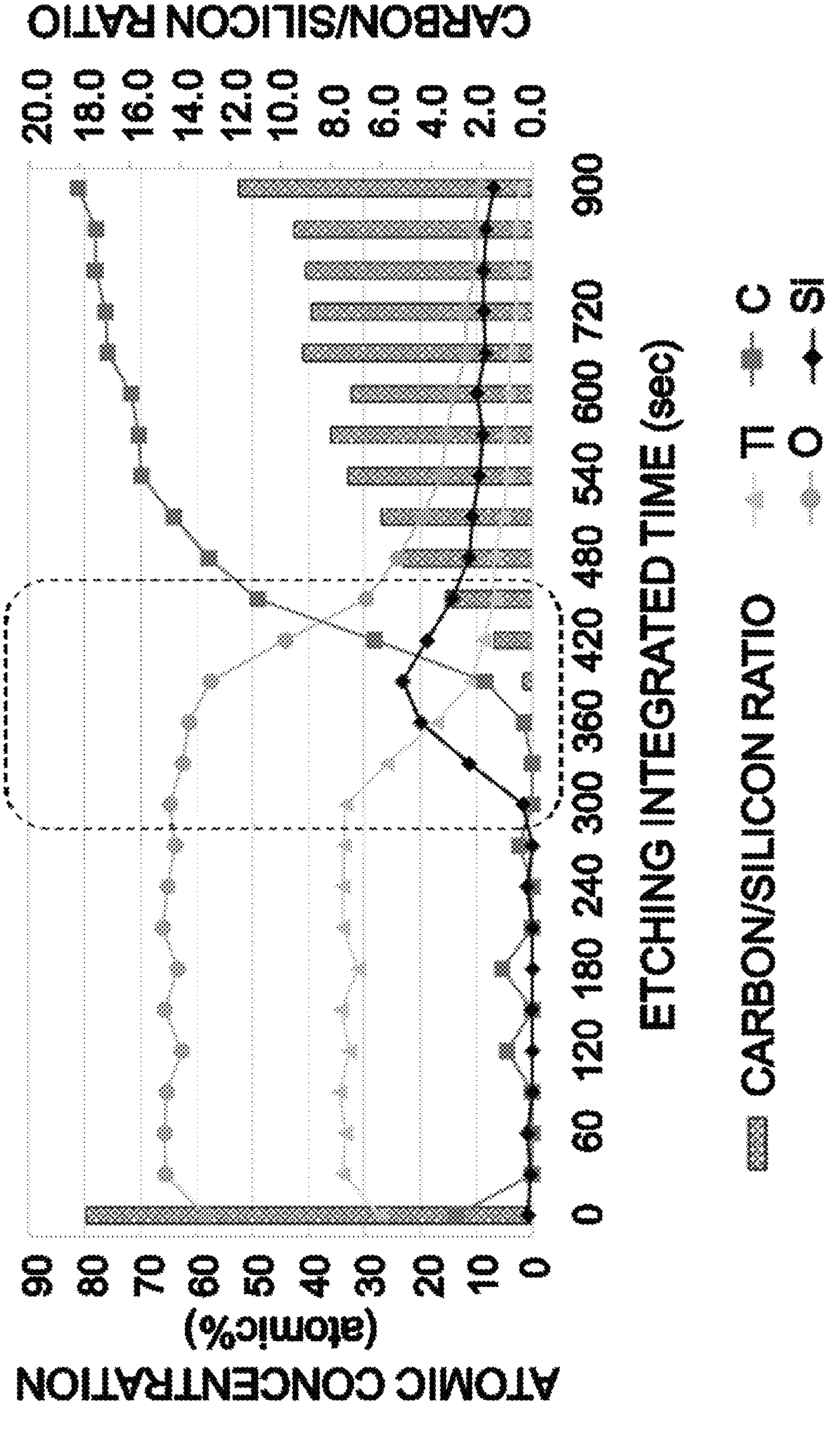
FIG. 5 shows results of XPS analysis of an organic film subjected to carbon reduction.
Figure 6:
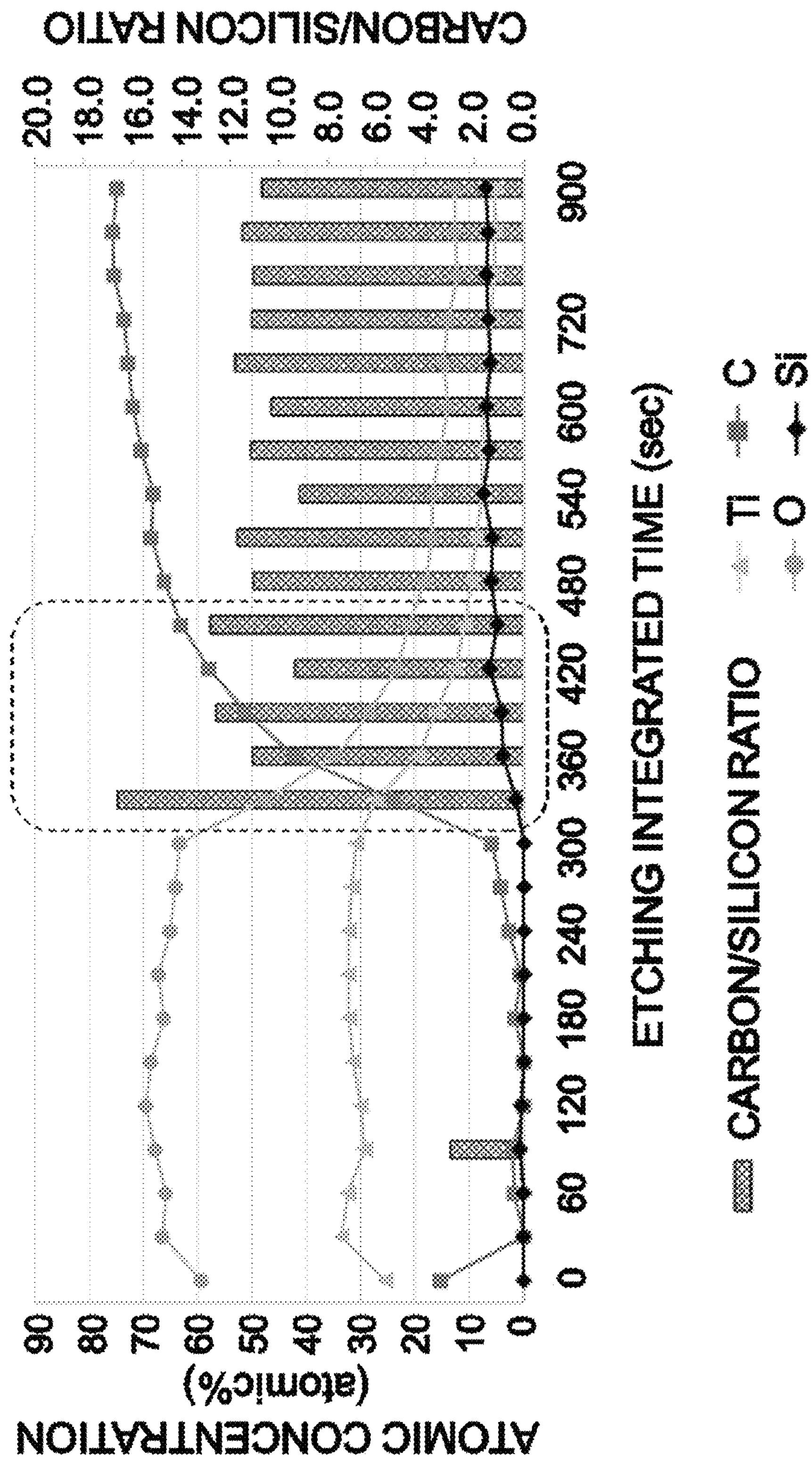
FIG. 6 shows results of XPS analysis of an organic film that has not been subjected to carbon reduction.

Ti, O, Si, and C elements were measured by X-ray photoelectron spectroscopy (XPS) in the depth direction while sputtering the organic film, which was treated under such conditions and on which the protective film was formed, with He gas from the surface on the protective film side, and elemental analysis of the protective film and the organic film was performed. The results are shown in FIGS. 5 and 6. FIG. 5 shows the measurement results of the sample obtained by removing carbon by oxygen ashing, and FIG. 6 shows the measurement results of the sample not subjected to oxygen ashing.

FIG. 5 shows that atomic concentration of Ti started to decrease and that of carbon (C) and silicon (Si) started to increase from the etching integration time of around 300 sec. In the present disclosure, the measurement point where Si is detected at 1.0 atomic % or more is the interface between the protective film and the organic film, and the region within a thickness of 50 nm from the interface is the surface where carbon is reduced by oxygen ashing. Further, when it is difficult to ascertain the interface state completely from the result of this measurement, the fluctuation of the composition ratio in the region of about several nanometers at the interface between the organic film and the protective film can be confirmed from the rate of etching by sputtering. In this embodiment, since the thickness of the protective film is 130 nm and the etching integration time when Si is detected at 1.0 atomic % or more is about 300 sec, the etching rate can be calculated as $130/300 \approx 0.4$ nm/sec.

From the results obtained by this measurement method, it is possible to determine the oxygen ashing conditions for improving the adhesiveness by regulating the carbon reduction amount in the organic film within a certain range.

As a result, it was found that a region in which the ratio of carbon to silicon based on atomic percentage (referred to hereinbelow simply as "carbon/silicon ratio") was greater than 0.0 and less than or equal to 5.0 was formed within 50 nm from the surface of the oxygen-ashed organic film on the protective film side, and the carbon/silicon ratio exceeded 5.0 in the portion of the organic film exceeding 50 nm from the surface on the protective film side.

This indicates that oxygen ashing reduced the amount of carbon in at least a part of the region within 50 nm from the surface of the organic film on the protective film side. Further, as a result of performing the same XPS measurement using a sample not subjected to oxygen ashing, it was found that, as shown in FIG. 6, the amount of Ti started to decrease and the amount of C and Si started to increase from around the etching integration time of about 300 seconds as in FIG. 5. However, the result was that the carbon/silicon ratio in the region within 50 nm from the surface of the organic film on the protective film side was 10.0 or more.

When a test was conducted at 121° C. for 20 h with a PCT test device (pressure cooker test) while the substrate joined body produced in this step was immersed in ink, there was no peeling of the protective film in the sample subjected to oxygen ashing treatment. By contrast, the protective film of the sample not subjected to the oxygen ashing treatment was peeled off from the interface between the organic film and the protective film.

This result shows that a protective film that is less likely to be cracked and is unlikely to peel off can be formed on an organic film on which the protective film is formed by creating a region in which the carbon/silicon ratio is greater than 0.0 and less than or equal to 5.0 in at least a part of the region within 50 nm from the surface of the organic film on the protective film side.

Further, it is preferable that a region in which the carbon/silicon ratio is from 10.0 to 30.0 (preferably from 8.0 to 25.0, and more preferably from 6.0 to 20.0) be not present in the region within 50 nm from the surface on the protective film side.

The carbon/silicon ratio is preferably from 1.0 to 4.0, and more preferably from 1.5 to 3.5. The carbon/silicon ratio can be controlled by varying the stage temperature, ashing time, and RF bias power.

As the carbon amount reduction step, oxygen ashing, which is a kind of oxidation treatment, was used in the above embodiment, but this step is not limited to the oxidation treatment. Further, when the oxidation treatment is adopted as the carbon amount reduction step, the treatment is not limited to the oxygen ashing by plasma oxidation using $O_2$ plasma, and the oxygen ashing may be performed by ozone oxidation using ozone.

When oxygen ashing is adopted as the carbon amount reduction step, the stage temperature can be preferably from 5 to 350° C. Further, the RF bias power may or may not be applied, and the RF bias power when applied is preferably from 50 to 200 W. Further, the ashing time is preferably from 0.5 to 10 min.

Titanium tetrachloride was used as the raw material gas in the above embodiment, but the raw material gas is not limited to titanium tetrachloride.

Further, as the oxidizing agent, pure water was used in the above embodiment, but the oxidizing agent is not limited to pure water.

Furthermore, the film formation temperature of the protective film is preferably from 150 to 500° C.

Divinyltetramethylsiloxane benzocyclobutene was used in the above embodiment as the organosilicon compound capable of forming an organic film (adhesive), but this organosilicon compound is not limiting. As the organosilicon compound, for example, at least one compound selected from the group consisting of divinyltetramethylsiloxane benzocyclobutene and bis-vinylsiloxane benzocyclobutene can be used. The organic compound can be used as a solution, and the solvent of the solution can be, for example, 1,3,5-trimethylbenzene. The solution can be adjusted to have a viscosity of from 15 to 50 cps (for example, 35 cps).

The thickness of the organic film is not particularly limited, but is preferably from 0.1 to 10 μm, and more preferably from 1 to 5 μm.

As the first substrate and second substrate, known substrates used as substrates for functional devices such as MEMS and microfluidic devices can be used without particular limitation, but silicon substrates are preferable. The thickness of the first substrate and second substrate is also not particularly limited, but may be preferably from 500 to 1000 μm.

Embodiment

Figure 4A:
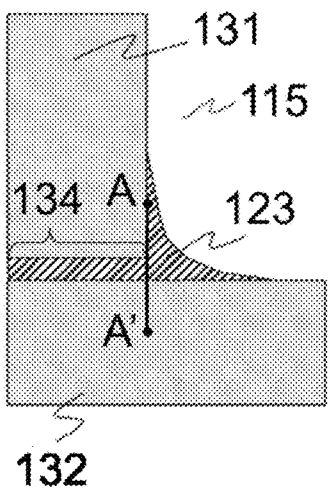
FIGS. 4A to 4C are enlarged cross-sectional views showing the method for manufacturing the substrate joined body of the present disclosure.
Figure 4B:
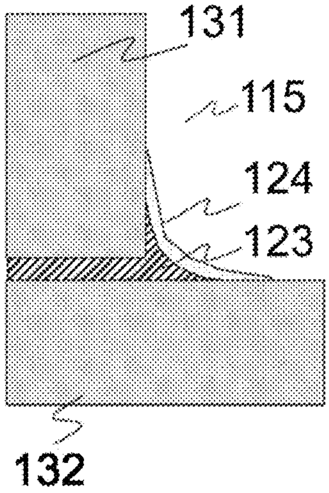
Figure 4C:
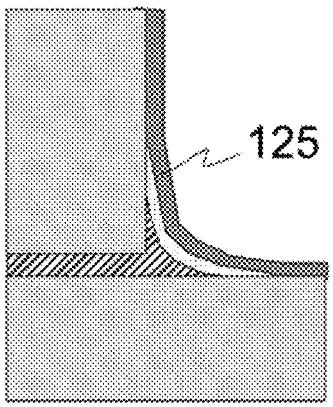

FIGS. 4A to 4C are enlarged cross-sectional views showing an example of a method for manufacturing a substrate bonding body according to the embodiment of the present disclosure. Explanation in FIGS. 4A to 4C is given using the first substrate 131 and the second substrate 132, but the present disclosure is aimed at suppressing peeling and hair cracking of the protective film 125 on the organic film 123. That is, the effect is exerted even when the first substrate 131 and the second substrate 132 are not joined, but here, an embodiment in which the first substrate 131 and the second substrate 132 are joined is explained to illustrate a case in which the problem occurs.

In FIGS. 4A to 4B, in the same layered configuration as in the abovementioned embodiment, a region 124 in which the carbon/silicon ratio is greater than 0.0 and less than or equal to 5.0 is formed in a carbon amount reduction step on the surface of an organic film 123 exposed between the first substrate 131 and the second substrate 132. In FIG. 4C, a protective film 125 is formed over the organic film 123 from at least a part of the surface of the first substrate 131 and at least a part of the surface of the second substrate 132. With this configuration, the protective film 125 formed on the organic film 123 is less likely to be peeled off from the surface of the organic film 123, cracks are less likely to occur in the protective film 125, and poor joining of the substrates caused by penetration of ink that causes damage to the organic film (adhesive) can be suppressed.

Although the aspects of the present disclosure have been described with reference to the substrate joined body, the aspects of the present disclosure are not limited to the substrate joined body as described above, and application is also possible to a structure including a substrate, an organic film that is present on the substrate and includes silicon and carbon, and a protective film that includes an inorganic element and is formed on the organic film.

As the substrate of the structure, the same one as the first substrate or the second substrate of the substrate joined body can be used.

Further, the organic film of the structure is present on the substrate, for example, the organic film may be attached to at least a part of the substrate, or the organic film may be formed on the substrate. Further, for the organic film of the structure, a compound including silicon and carbon, for example, a compound of a structure in which benzocyclobutene similar to the organic film of the abovementioned substrate joined body has a siloxane bond and/or a polysiloxane bond, specifically, divinyltetramethylsiloxane benzocyclobutene, bis-vinylsiloxane benzocyclobutene, and the like can be used. The compound can be a solution using 1,3,5-trimethylbenzene or the like as a solvent, similarly to the organic film of the abovementioned substrate joined body, and the viscosity of the solution can be adjusted from 15 to 50 cps (for example, 35 cps).

Furthermore, the protective film of the structure includes an inorganic element, and can include, for example, the same element as the protective film of the substrate joined body. In addition, the protective film of the structure is formed on the organic film, and can be formed, for example, by the same method as the protective film of the substrate joined body.

EXAMPLES

The present invention is more specifically described herebelow using examples. The present invention is not limited by the examples that follow. The number of parts in the following formulations is on a mass basis in all instances unless specifically indicated otherwise.

Example 1

As an example in the present embodiment, a substrate joined body was manufactured as shown in FIG. 3A to 3H.

Figure 3A:
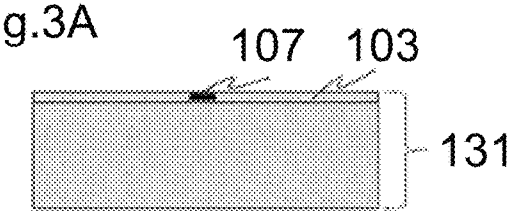
FIGS. 3A to 3H are schematic cross-sectional views illustrating a method for manufacturing the substrate joined body of the present disclosure.

FIG. 3A to 3H are schematic cross-sectional views showing a method of manufacturing a substrate joined body. The first substrate 131 was prepared by forming an aluminum wiring, an interlayer insulating film composed of a silicon oxide thin film, a heater thin-film pattern of tantalum nitride as an energy generating element 107, and a contact pad 103 to be conductively connected to an external control unit on the front surface (mirror surface) of an 8-inch silicon substrate (thickness 730 μm) (FIG. 3A). The surface on which the aluminum wiring, the interlayer insulating film composed of a silicon oxide thin film, a heater thin-film pattern of tantalum nitride as an energy generating element 107, and a contact pad 103 to be conductively connected to an external control unit are formed is defined as the "front surface of the first substrate 131", and the surface opposite to the front surface of the first substrate 131 is defined as the "back surface of the first substrate 131".

An ultraviolet radiation-curable tape having a thickness of 180 μm was attached as a protective tape to the front surface of the first substrate, and the back surface of the first substrate was thinly processed with a grinding device until the substrate thickness became 500 μm. Then the ground surface was smoothed by polishing with a CMP device. The polishing was performed using a slurry containing colloidal silica as a main component and a polyurethane-based polishing pad. Then, the polished surface was washed with a washing liquid consisting of a mixed liquid of 8% by mass of ammonia, 8% by mass of hydrogen peroxide solution, and 84% by mass of pure water to remove the slurry.

Figure 3B:
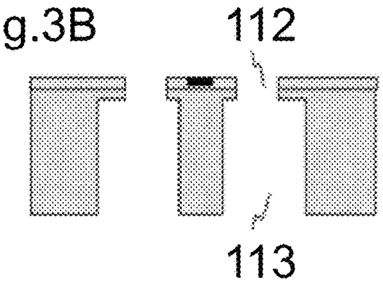

Next, a groove serving as a second flow path 113 was formed by etching (FIG. 3B). For etching, a Bosch process was used in which etching with $SF_6$ gas and deposition with $C_4F_8$ gas were repeated. The etching was stopped when the average groove depth reached 300 μm. After irradiating the protective tape with ultraviolet rays to remove the protective tape, the resist and etching deposits were removed with a stripping solution including hydroxylamine as a main component.

Next, a protective tape was attached to the back surface of the first substrate 131, a resist mask was formed on the front surface by the same means as above, and dry etching was performed from the front surface side of the first substrate 131 to form a first flow path 112 composed of a plurality of holes. After the etching, the protective tape was removed, and the resist and deposits were removed with the stripping solution.

Figure 3C:
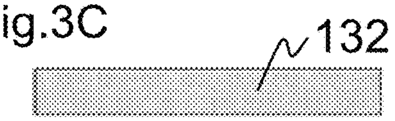
Figure 3D:
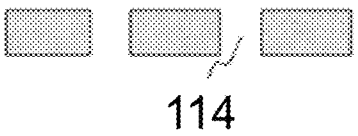

Next, a silicon substrate with a thickness of 500 μm was prepared as the second substrate 132 (FIG. 3C). A protective film was attached to the front surface (mirror surface) of the second substrate 132, a resist mask was formed on the back surface, and a third flow path 114 was formed by the Bosch process (FIG. 3D). Then, the protective film was peeled off, and the resist and the deposit were removed by the stripping solution.

Next, an adhesive 123 was applied to the back surface of the first substrate 131. First, an 8-inch silicon substrate was separately prepared, and a 1,3,5-trimethylbenzene solution (viscosity=35 cps) of divinyltetramethylsiloxane benzocyclobutene as the adhesive 123 was spin-coated on the substrate to a thickness of 2 μm. Then, the adhesive 123 was transferred to the back surface of the first substrate 131 by bringing the joint surface of the first substrate 131 into contact with the coated adhesive 123.

Figure 3E:
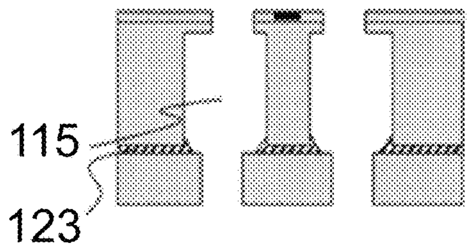

Next, the first substrate 131 and the second substrate 132 were aligned using a joint alignment device, and the two ends of the substrates were temporarily fixed by pressurizing with a clamp jig (not shown) (FIG. 3E, FIG. 4A). The temporarily fixed substrates were transferred into a joining device, heated to 150° C. in vacuum, pressure-joined for 5 min, cooled, and taken out from the joining device. Then, the adhesive 123 was cured by performing a heat treatment at 250° C. for 1 h in an oven in a nitrogen atmosphere.

Figure 3F:
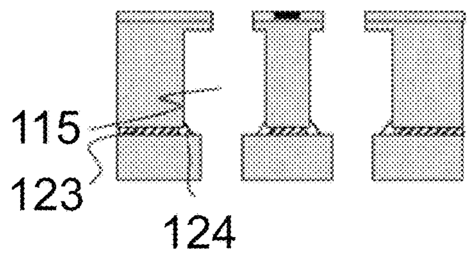

Next, ashing treatment was performed for 1 min, without applying RF bias power to the lower electrode, with $O_2$ plasma excited at a stage temperature of 250° C. and at 200 W, the amount of carbon was reduced from the surface of the adhesive 123 spreading from the joint portion of the first substrate 131 and the second substrate 132, and a region 124 having a carbon/silicon ratio of greater than 0.0 and less than or equal to 5.0 was formed (FIG. 3F, FIG. 4B).

Figure 3G:
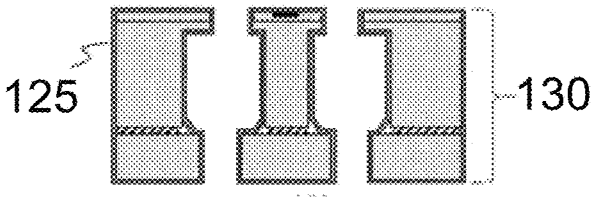

Further, a TiO film was formed as a protective film 125 with a thickness of 130 nm (FIGS. 3G and 4C).

In this example, the thermal ALD-TiO film was formed by using $TiCl_4$ and pure water, and the film was formed by alternately supplying $TiCl_4$ and pure water. At this time, in the film-forming cycle, the gas obtained by vaporizing $TiCl_4$ was transported into the furnace together with nitrogen and sprayed for 5 sec, followed by sufficient purging with nitrogen and discharge. Next, the gas obtained by vaporizing pure water was transported into the furnace together with nitrogen and sprayed for 5 sec, followed by sufficient purging with nitrogen and discharge. This cycle was regarded as one cycle, the same cycle was repeated about 2000 times, and the titanium oxide film was layered to 130 nm at a film formation temperature controlled at 300° C.±10° C. to obtain a substrate joined body 130. As for the film forming method, a thermal atomic layer deposition method was adopted as the atomic layer deposition method in this example, but the film forming method based on the plasma atomic layer deposition method may also be used. Further, the protective film may be formed by a method other than the atomic layer deposition method.

The substrate joined body 130 is a structure in which the first substrate 131 and the second substrate 132 are joined and which has a flow path (second flow path 113 and third flow path 114). An organic film (adhesive) 123 that joins these substrates is present between the first substrate 131 and the second substrate 132. The protective film 125 is formed over the organic film 123 from at least a part of the surface of the first substrate 131 and at least a part of the surface of the second substrate 132. Then, a dry film resist composed of a positive resist was laminated on the front surface of the first substrate 131 of the substrate joined body to form an etching mask. The protective film 125 on the contact pad 103 was removed by etching with a fluorine-based etching solution.

Figure 3H:
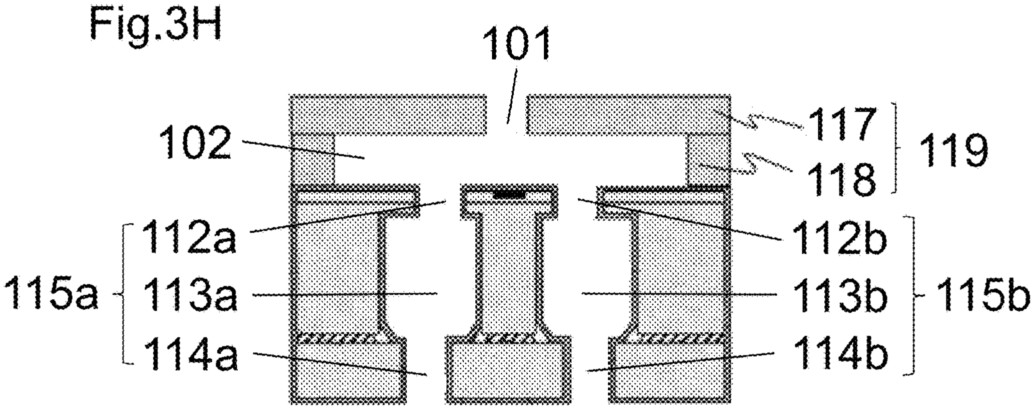

Next, a negative-type dry film made of an epoxy resin was attached to the front surface of the first substrate 131 and exposed to form a wall 118 of a discharge port forming member 119. Further, a dry film was attached from thereabove and exposed to form a top plate 117 of the discharge port forming member 119. Then, the unexposed portion was removed by development to form a discharge port 101 and a pressure chamber 102 (FIG. 3H). The discharge port forming member 119 was thereafter cured by heat-treating in an oven under the conditions of 200° C. and 1 h. In this way, a liquid discharge head was manufactured.

Example 2

A manufacturing method in which the conditions of reducing the amount of carbon (FIG. 3F) by the same step as that of FIG. 3A to 3H were changed is shown as Example 2 in the embodiment. The steps from FIG. 3A to FIG. 3E were carried out by the same method as in Example 1.

Next, the step of reducing the amount of carbon that is shown in FIG. 3F will be described. In Example 2, by performing ashing with $O_2$ plasma at a low temperature, it is possible to further suppress the generation of cracks in the organic film.

In Example 2, an RF bias power of 120 W was applied at a stage temperature of 16° C., an ashing treatment using $O_2$ plasma was performed for 5 min, and the amount of carbon was reduced from the surface of the adhesive 123 spreading from the joint portion between the first substrate 131 and the second substrate 132. As a result, as in the first embodiment, it was possible to obtain a substrate joined body and a liquid discharge head in which cracking and peeling of the protective film could be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2021-091395, filed May 31, 2021, which is hereby incorporated by reference herein in its entirety.

What is claimed is:

1. A substrate joined body comprising:

a first substrate;

a second substrate;

an organic film that comprises silicon and carbon, and the organic film joins the first substrate and the second substrate; and a protective film that comprises an inorganic element, and the protective film is formed over the organic film from at least a part of a surface of the first substrate and at least a part of a surface of the second substrate, wherein the organic film comprises a region in which a ratio of carbon to silicon based on atomic percentage is from 0.0 to 5.0 in a region within 50 nm in a thickness direction from a surface of the organic film on a side of the protective film, when the surface is measured by X-ray photoelectron spectroscopy.

2. The substrate joined body according to claim 1, wherein at least one of the first substrate and the second substrate is a silicon substrate.

3. The substrate joined body according to claim 1, wherein the organic film comprises at least one selected from the group consisting of an organosilicon compound and a polymer of the organosilicon compound.

4. The substrate joined body according to claim 3, wherein the organosilicon compound comprises at least one compound selected from the group consisting of divinyltetramethylsiloxane benzocyclobutene and bis-vinylsiloxane benzocyclobutene.

5. The substrate joined body according to claim 1, wherein the protective film comprises at least one element selected from the group consisting of Ta, Ti, Zr, Nb, V, Hf, and Si as a simple substance, an oxide, a nitride, or a carbide.

6. The substrate joined body according to claim 1, wherein the protective film comprises at least one compound selected from the group consisting of TaO, TiO, SiOC, SiC, SiCN, TaN, and TiN.

7. The substrate joined body according to claim 1, wherein the region in which the ratio of carbon to silicon based on atomic percentage is from 0.0 to 5.0 comprises a region in which the ratio is from 1.0 to 4.0.

8. A structure comprising:

a substrate;

an organic film that is present on the substrate and comprises silicon and carbon; and a protective film that comprises an inorganic element, and the protective film is formed on the organic film, wherein the organic film comprises a region in which a ratio of carbon to silicon based on atomic percentage is from 0.0 to 5.0 in a region within 50 nm in a thickness direction from a surface of the organic film on a side of the protective film, when the surface is measured by X-ray photoelectron spectroscopy.

9. A method for manufacturing a substrate joined body comprising:

a first substrate;

a second substrate;

an organic film that comprises silicon and carbon, and the organic film joins the first substrate and the second substrate; and a protective film that comprises an inorganic element, and the protective film is formed over the organic film from at least a part of a surface of the first substrate and at least a part of a surface of the second substrate, the manufacturing method comprising:

a step of joining the first substrate and the second substrate with the organic film being interposed therebetween;

a carbon amount reduction step of forming a region in which a ratio of carbon to silicon based on atomic percentage is from 0.0 to 5.0 in a region within 50 nm in a thickness direction from a surface of the organic film on a side of the protective film, when the surface is measured by X-ray photoelectron spectroscopy; and a step of forming the protective film on the organic film over a region where the first substrate and the second substrate are joined.

10. The method for manufacturing a substrate joined body according to claim 9, wherein the protective film is formed by an atomic layer deposition method.

11. The method for manufacturing a substrate joined body according to claim 10, wherein the atomic layer deposition method is at least one atomic layer deposition method selected from the group consisting of a thermal atomic layer deposition method and a plasma atomic layer deposition method.

12. The method for producing a substrate joined body according to claim 9, wherein the carbon amount reduction step is at least one selected from the group consisting of plasma oxidation and ozone oxidation.

13. A liquid discharge head comprising:

a substrate joined body comprising a first substrate;

a second substrate;

an organic film that comprises silicon and carbon, and the organic film joins the first substrate and the second substrate; and a protective film that comprises an inorganic element, and the protective film is formed over the organic film from at least a part of a surface of the first substrate and at least a part of a surface of the second substrate; and a discharge port forming member comprises a top plate on which a wall and a discharge port is formed, wherein the first substrate further comprises an energy generating element, and wherein the organic film comprises a region in which a ratio of carbon to silicon based on atomic percentage is from 0.0 to 5.0 in a region within 50 nm in a thickness direction from a surface of the organic film on a side of the protective film, when the surface is measured by X-ray photoelectron spectroscopy.

* * * * *